(12) United States Patent
Lux et al.

(10) Patent No.: US 8,334,336 B2
(45) Date of Patent: Dec. 18, 2012

(54) FLUID ACTIVATABLE ADHESIVES AND FLUIDS FOR ACTIVATING SAME FOR USE WITH LINER-FREE LABELS

(75) Inventors: Benjamin David Lux, Providence, RI (US); Daniel Youngwhan Cho, Pawtucket, RI (US); Felix Perets Shvartsman, New Haven, CT (US)

(73) Assignee: NuLabel Technologies, Inc., Providence, RI (US)

( * ) Notice: Subject to any disclaimer, the term of this patent is extended or adjusted under 35 U.S.C. 154(b) by 0 days.

(21) Appl. No.: 13/294,545

(22) Filed: Nov. 11, 2011

(65) Prior Publication Data

US 2012/0059092 A1 Mar. 8, 2012

Related U.S. Application Data

(60) Provisional application No. 61/440,384, filed on Feb. 7, 2011.

(51) Int. Cl.
*C08G 18/42* (2006.01)
*C08K 5/05* (2006.01)
(52) U.S. Cl. ........................ 524/500; 524/388
(58) Field of Classification Search ............... 524/17
See application file for complete search history.

(56) References Cited

U.S. PATENT DOCUMENTS

| | | | |
|---|---|---|---|
| 3,531,316 A | 9/1970 | Sternasty | |
| 6,020,062 A | 2/2000 | Questel | |
| 6,210,795 B1 | 4/2001 | Nelson | |
| 6,298,894 B1 | 10/2001 | Nagamoto | |
| 6,656,319 B1 * | 12/2003 | Boyd et al. | 156/305 |
| 7,943,714 B2 * | 5/2011 | Schnieders et al. | 526/319 |
| 2011/0033698 A1 * | 2/2011 | Woods et al. | 428/346 |

* cited by examiner

*Primary Examiner* — Hui Chin
(74) *Attorney, Agent, or Firm* — Pabst Patent Group LLP

(57) ABSTRACT

Fluid activatable adhesive compositions and activating fluid(s) for activating the adhesive composition are described herein. The adhesive compositions contain at least two polymers with different hydrophilicities. The hydrophilic polymer has quick tack when exposed to a hydrophilic solvent, such as water or other aqueous solvent, while the hydrophobic polymer provides strong adhesion to a paper or polymeric substrate. The adhesive composition may contain particulate fillers which enable fast exhaustion of the activation fluid out of the adhesive when applied to a substrate, thereby allowing the hydrophobic polymers of the adhesive composition to achieve strong adhesion of the liner-free label to the paper or polymeric substrate. The particulate fillers may also function as anti-blocking agents when liner-free label media are tightly wound in a roll. The adhesive compositions described herein may be used not only on paper, cardboard, and metal, but also on glass and plastics commonly used in commercial applications.

20 Claims, No Drawings

FLUID ACTIVATABLE ADHESIVES AND FLUIDS FOR ACTIVATING SAME FOR USE WITH LINER-FREE LABELS

CROSS REFERENCE TO RELATED APPLICATIONS

This application claims priority to U.S. Ser. No. 61/440,384 entitled "Fluid Activatable Adhesives and Fluids for Activating Same for Use with Liner-Free Labels" filed Feb. 7, 2011, the contents of which are incorporated by reference.

FIELD OF THE INVENTION

The present invention relates to fluid activatable adhesives and fluids for activating the adhesives, particularly for use with liner-free or liner-less labels, capable of adhering to a variety of substrates, such as paper or polymeric substrates.

BACKGROUND OF THE INVENTION

Label printing and/or labeling typically consists of label media which include an adhesive composition layer that is constantly and consistently tacky. Many of these label media are formed with a removable non-stick layer, containing a release coat and a release liner, over the adhesive composition layer, to prevent the adhesive composition layer from coming into contact with internal components of a label printer, applicator, or labeler and/or the printable layer of an adhesive sheet when an adhesive sheet is wound in a form such as a roll.

In some instances, the liner layer is disposed of after printing or at the time the label is applied to an article, either manually or by an autonomous process designed for the removal purpose. The disposable liner layers create waste disposal issues.

In other instances, an adhesive label is formed by a sheet, having a printed layer, a release coat, and an adhesive composition layer. The release coat prevents the adhesive composition layer from adhering to the printed layer, but standard printing, labeling, and label applying equipment must be coated with a non-stick material to prevent the adhesive composition layer of the adhesive label from gumming or jamming the equipment components. Instead of covering an adhesive composition layer with a non-stick material, a printable layer of a label and internal components of a label printer are coated with a non-stick material to resist the adhesive composition layer of the label that is constantly and consistently tacky. This technique requires the additional step of coating components with a non-stick material, which can significantly increase costs.

Numerous attempts have been made to use conventional polymeric adhesive compositions with tacky or pressure-sensitive adhesives (PSA) in liner-free label constructions where a non-stick or release layer is coated onto the opposite side of the adhesive label. These are not compatible in conventional labeling equipment, requiring special liner-free label printers and application systems. In addition, the non-stick top-coating greatly reduces the printability of the label. The PSAs cause machine problems by gumming up label application systems and create cleanup issues. Other attempts have been made to make a dry-gum or water or solvent or co-solvent remoistenable adhesive label. These are typically based on both carbohydrate and synthetic polymeric adhesives. These adhesives have little utility on many synthetic and non-porous substrates as they do not form substantial adhesive or mechanical bonds to the substrate. These substrates are labels prone to "swimming" or moving from the desired application area during down-stream processing due to a lack in rapid bond formation. As such, these attempts have had little success.

Certain liner-free labels have been developed having a printed layer, a sheet, and an adhesive composition layer that can be made tacky by an activator prior to or after printing/applying an image. However, many of these embodiments still require a non-stick coating to avoid the gumming problem discussed above, such as described in U.S. Pat. No. 6,298,894 by Nagamoto et al. which disclose the use of silicone oil as a non-stick coating. In addition, many of the activatable adhesive liner-free labels are water activated and/or solvent activated. These labels lack both strong adhesion on polymeric substrates and quick tack to polymeric substrates. These labels are also prone to "swimming" as discussed above.

Each of the prior art systems discussed above presents different drawbacks. A non-stick liner layer is typically non-recyclable and not re-usable, thereby generating waste for every label that is used. Coating components with non-stick material increases the costs of the system and may not entirely prevent gumming of the system, which is likely to occur when an adhesive residue adheres to the label printer/applicator component.

It is therefore desirable to eliminate the need for an adhesive sheet to be formed with a non-stick liner layer or for the label printer/applicator components to be coated with non-stick materials. It is also desirable for a water-activated and/or solvent-activated liner-free label to exhibit both quick tack to polymeric substrates and strong adhesion on polymeric substrates.

Accordingly, it is an object of the invention to provide liner-free adhesive labels and methods of making and using thereof, wherein the label is activated by water and/or another solvent and exhibits quick tack to, and strong adhesion on, a variety of substrates including polymeric substrates.

The present invention offers significant ecological benefits compared to the prior art and products currently commercialized that may be considered competitive to the present invention in particular markets. The compositions, methods, and kits described herein offer significant ecological benefits compared to the prior art as well as products currently commercialized in particular markets. For example, the compositions, methods, and kits described herein eliminate the liner backing which is a waste byproduct of liner-backed pressure sensitive adhesive labels. This reduces landfill waste and eliminates the energy and carbon emissions from the production of liner backing and the shipment of the material to suppliers and customers.

In addition, the compositions, methods, and kits described herein eliminate the silicone release layer which is either disposed of on the liner backing in liner-backed pressure sensitive adhesive labels or on the top of the printed layer of linerless pressure sensitive adhesive labels. In either existing art, the silicone presents an energy intensive manufacturing process and the addition of a petrochemical derivative product that is unnecessary and eliminated by the compositions, methods, and kits described herein, thereby reducing the carbon footprint of the label and the requirement for silicone to be utilized in the label manufacturing process.

SUMMARY OF THE INVENTION

Fluid activatable adhesive compositions and activating fluid(s) compositions for activating the adhesive compositions, which provide improved liner-free labels capable of adhering to a variety of paper and polymeric substrates, are described herein.

The adhesive compositions contain at least two polymers with different hydrophilicities. The more hydrophilic polymer(s) may be referred to as "the hydrophilic polymer" and the less hydrophilic polymer(s) may be referred to as "the hydrophobic polymer". The hydrophilic and hydrophobic polymers are selected to allow the at least one hydrophilic polymer to have a characteristic of quick tack when exposed to a hydrophilic solvent, such as water or other aqueous solvent, while the at least one hydrophobic polymer has a characteristic which enables strong adhesion to a paper or polymeric substrate. Alternatively, hydrophilic and hydrophobic moieties can be incorporated in various ratios onto a single polymer backbone yielding a dual functional copolymer.

The adhesive composition may contain hygroscopic particulate fillers which enable fast exhaustion of the activation fluid out of the adhesive when applied to a substrate, thereby allowing the hydrophobic polymers of the adhesive composition to achieve strong adhesion of the liner-free label to the paper or polymeric substrate. The particulate fillers may also provide fast absorption of the activation fluid composition into the full thickness of the adhesive composition and rapid swelling of not only the hydrophilic part, but also the hydrophobic part, of the adhesive composition. The particulate fillers may also function as anti-blocking agents when liner-free label media are tightly wound in a roll.

The compositions described herein can quickly go from a non-tacky to a tacky state enabling the use of water-activated and/or solvent-activated liner-free labels for label printing and labeling that require both quick tack and strong adhesion. In general the tacky characteristics are drawn from the immediate swelling of the hydrophilic polymers. These in turn swell the entire polymer layer allowing both the hydrophobic and hydrophilic components to wet onto the desired substrate forming an adhesive bond.

The adhesive compositions described herein may be used not only on paper, cardboard, and metal, but also on glass and plastics commonly used in commercial applications including, but not limited to, polyethylene terephthalate (PETE, PET, PETG), polyethylene (PE), polystyrene (PS), low-density polyethylene (LDPE), linear low-density polyethylene (LLDPE), high density polyethylene (HDPE), polypropylene (PP), polyvinyl chloride (PVC) and polyvinyl chloride films, and TYVEK®, as well as other low energy and thermoplastic substrates.

Kits containing the adhesive formulations are also described herein. The kit can contain only the adhesive formulation. The kits can contain the adhesive formulation and uncoated labels. The kits can contain paper or synthetic (polymeric film) labels which have been coated with the adhesive formulation and the activating fluid. The kits can contain coated labels, activating fluid, and an activation apparatus used to apply the activating fluid to the solvent-sensitive adhesive layer. The activation apparatus may also be incorporated into a printer or other label dispensing device.

The compositions, methods, and kits described herein offer significant ecological benefits compared to the prior art as well as products currently commercialized in particular markets. For example, the compositions, methods, and kits described herein eliminate the liner backing which is a waste byproduct of liner-backed pressure sensitive adhesive labels. This reduces landfill waste and eliminates the energy and carbon emissions from the production of liner backing and the shipment of the material to suppliers and customers.

In addition, the compositions, methods, and kits described herein eliminate the silicone release layer which is either disposed of on the liner backing in liner-backed pressure sensitive adhesive labels or on the top of the printed layer of linerless pressure sensitive adhesive labels. In either existing art, the silicone presents an energy intensive manufacturing process and the addition of a petrochemical derivative product that is unnecessary and eliminated by the compositions, methods, and kits described herein, thereby reducing the carbon footprint of the label and the requirement for silicone to be utilized in the label manufacturing process.

DETAILED DESCRIPTION OF THE INVENTION

I. Definitions

"Hydrophilic polymer", as used herein, refers to one or more polymers in the adhesive composition having a greater affinity for water than one or more other polymers in the adhesive composition. Hydrophilicity can be quantified by measuring its partition coefficient between water (or a buffered aqueous solution) and a water-immiscible organic solvent, such as octanol, ethyl acetate, methylene chloride, or methyl tert-butyl ether. If after equilibration a greater concentration of the compound is attained in water than in the organic solvent, then the compound is considered hydrophilic.

"Hydrophobic polymer", as used herein, refers to one or more polymers in the adhesive composition having less affinity for water than one or more other polymers in the adhesive composition. Hydrophobicity can be quantified by measuring its partition coefficient between water (or a buffered aqueous solution) and a water-immiscible organic solvent, such as octanol, ethyl acetate, methylene chloride, or methyl tert-butyl ether. If after equilibration a greater concentration of the compound is attained in the organic solvent than in water, then the compound is considered hydrophobic.

"Tack" or "quick tack", as used herein, refers to instantaneous or nearly instantaneous formation of a bond between an adhesive and surface when brought into light contact for a very short period, e.g., less than five second. Tack properties are dependant, at least in part, on the viscoelastic flow characteristics of the polymer adhesive system. In a system where a volatile solvent-based activation method is being employed, it is possible for the system to possess initial tack when the adhesive is in a moist state and no tack (but still be well adhered to a substrate through adhesive bonding) once the moisture has evaporated or been removed. Tack is particularly relevant where bonds must immediately sustain forces after assembly. Tack forces are particularly significant in maintaining bond strength to low surface energy substrates when chemical or mechanic bonding processes do not readily occur. Tack measurement methods are typically application specific, however the Standard Test Method for Tack of Pressure-Sensitive Adhesives by Rolling Ball (D3121-06) as developed by the American Society for Testing and Materials (ASTM) provides a reliable measurement method. In this method a ball of a fixed size is rolled down a ramp of a fixed height and propelled onto a tacky label. The distance the ball travels across the label provides a measure of tack. "No tack" or "non-tacky" means that there is no such instant contact bond or adhesion between the adhesive and the substrate.

"Blocking" refers to the formation of a bond between the adhesive layer of the label and the top of the label when the label is in roll or stacked form.

"Adhesion" or "adhesive bonding", as used herein, refers to the longer term bond between the adhesive and the substrate and/or another adhesive. Adhesion, unlike tack, focuses on the bond created between a surface and a substrate (which can also be another adhesive) that is not dependent upon the viscoelastic flow characteristics of the adhesive.

Good adhesive tack (the combination between adhesion and tack) is achieved when the adhesive strength is greater than the cohesive strength of the adhesive system. A bond of adequate strength can be formed and maintained using adhesive forces, tack forces, or a combination of the two; however, bond formation is not limited by these forces. Peel strength is a force measure of both tack and adhesive forces. ASTM Standard D3330 (Standard Test Method for Peel Adhesion of Pressure-Sensitive Tape) provides an accurate measure of peel strength. For a particular substrate, average peel test values range from about 100 grams/inch to about 1,000 grams/inch, preferably from about 200 grams/inch to about 1,000 grams/inch, more preferably about 400 grams/inch to about 1,000 grams/inch to achieve adequate adhesion.

"Open time" as used herein, refers to the amount of time between the activation of the adhesive and the application of the label to a substrate.

II. Adhesive Compositions

The adhesive compositions described herein contain a mixture of adhesive materials, including one or more hydrophilic materials and one or more hydrophobic materials. In one embodiment, the hydrophilic and/or hydrophobic materials are polymeric materials. Each polymer may represent a single polymer or a blend of two or more different polymers. The compositions described herein allow for rapid water penetration into the hydrophilic material(s) and swelling of the hydrophilic adhesive components for the generation of quick tack followed by the redistribution of the activating solution into the hydrophobic material(s) for longer term adhesion.

Hygroscopic particulate fillers can be incorporated into the adhesive composition for the generation of both quick tack and longer term adhesion upon activation by an aqueous or solvent-based solution for adhesion to a variety of substrates, such as paper, cardboard, metal, as well as glass and plastics (i.e., low energy and thermoplastic substrates).

Hygroscopic agents (e.g., particulate fillers) in the adhesive formulations can modulate the kinetics of water distribution throughout the hydrophilic and hydrophobic components of the adhesion composition to achieve the desired adhesive behavior and performance of the liner-free label. Kinetics may also be modified by the degree hydrophilicity and hydrophobicity of the polymers in the adhesive layer.

A. Hydrophilic Materials

The hydrophilic materials, e.g. polymeric materials, in the adhesive compositions described herein provide quick tack, i.e., the initial adhesive force responsible for keeping the label adhered to the substrate, for the adhesive compositions. The speed or quickness of activation of the hydrophilic material(s) are such that it enables the adhesive, upon application of an activating fluid, to not move (or swim) (or minimize such) once applied to the desired application area of a substrate. This is of particular utility in high throughput label operations where swimming could result in a misplaced label. The polymer component(s) are obtained either as aqueous solutions, emulsions, suspensions, or solids, which are diluted or dissolved to the desired concentration for incorporation into the adhesive composition.

Suitable materials include, but are not limited to, polyvinyl alcohols, polyvinyl acetates, polyvinylpyrrolidones, polyvinylpyrrolidone-vinyl acetate copolymers, polyacrylic acids, polyethylene glycols, poly(2-ethyl-2-oxazoline), polyacrylamide copolymers, ethylene vinyl acetates, cellulose derivatives, particularly alkyl cellulose derivatives (cellulose acetate, methyl cellulose, ethyl/hydroxyethyl, hydroxymethylpropyl cellulose, etc.), ureas, gelatins, alginates, agars, gum arabics, and other similar materials as well as combinations of the above materials. Other material(s) having the desired short-term adherence characteristic may also be used.

In one embodiment, the hydrophilic polymer is a poly(2-ethyl-2-oxazoline), such as those available under the tradename Aquazol (e.g., Aquazol 200 (mol. wt. 200,000) or Aquazol 500 (mol. wt. 500,000)), vinyl pyrrolidone/vinyl acetate copolymers, such as PVP/VA E-735 (available from Ashland Chemical Co.), and combinations thereof. The polymers may be available in solid form, such as dry powders or in solution, such as in ethanol, isopropanol, or water.

The hydrophilic polymers are typically present in an amount from about 10% to about 50% by dry weight of the adhesive film, preferably from about 20% to about 40% by dry weight of the adhesive film.

B. Hydrophobic Polymers

The hydrophobic adhesive material or materials are typically polymeric materials providing long-term tack (or adhesion) upon activation by an aqueous or solvent-based solution for adhesion to a substrate. These hydrophobic material(s) have the characteristic of being slower wetting than the hydrophilic material(s) described above and of providing long-term adhesion of the label to the substrate, especially to a hydrophobic or non-polar surface. The build up to such long-term adhesion may start while the initial adhesive force provided by the hydrophilic adhesive material(s) is also present due to the response to fluid activation. Upon removal or drying of the fluid and long after the hydrophilic adhesive material(s) lose all or some of their adhesive nature, the hydrophobic adhesive material(s) are responsible for the long term adhesion of the label facestock to the desired substrate.

Due to their hydrophobic nature, most of these polymer adhesive material(s) are available as stabilized emulsions, dispersions, and/or suspensions containing the polymer, surfactants/emulsifiers, stabilizers and other additives. These emulsions are diluted to the desired concentrations prior to incorporation into the final adhesive solutions. In a preferred embodiment, the desired overall concentration of the hydrophobic materials is 30% dry solids (weight-to-volume). This provides a sufficiently high amount of solids without increasing the viscosity beyond the acceptable range for many of the desired coating methods. Care must be taken with the pH of these emulsions to prevent destabilization or phase separation. The hydrophobic polymers are typically present in an amount from about 20% to about 80% by dry weight of the adhesive, preferably from about 40% to about 80% by dry weight of the adhesive, and most preferably from 50% to 75% by dry weight of the adhesive.

Suitable hydrophobic materials include, but are not limited to, natural and reclaimed rubbers, polyurethanes, non-carboxylated and carboxylated styrene-butadiene rubbers, polyacrylates based on the polymerization of monomers of methacrylates, methyl acrylate, ethyl acrylate, 2-chloroethyl vinyl ether, 2-ethylhexyl acrylate, hydroxyethyl methacrylate, butyl acrylate, butyl methacrylate or combinations of the previous, polyamides, polyesters, polyolefins, polyolefins containing maleic anhydride, polystyrenes, polyvinyl esters, polyvinyl ketones, polydiene elestomers, polyiso butylenes, poly butadienes, polychioroprenes, poly styrene acrylics, carboxylated acrylic, styrene and/or butadiene polymers, as well as combinations of the above materials. Other material(s) having the desired long-term adherence characteristic may also be used.

In one embodiment, the hydrophobic polytner(s) is a carboxylated styrene/butadiene copolymer, such as those available under the tradename Styranol (e.g., Styranol ND 430).

Styranol is available as an aqueous dispersion. In a particular embodiment, the hydrophilic polymer is a poly(2-ethyl-2-oxazoline), such as those available under the tradename Aquazol (e.g., Aquazol 200 (mol. wt. 200,000) or Aquazol 500 (mol. wt. 500,000)), vinyl pyrrolidone/vinyl acetate copolymers, such as PVP/VA E-735 (available from Ashland Chemical Co.), and combinations thereof and the hydrophobic polymer is a carboxylated styrene/butadiene copolymer, such as those available under the tradename Styranol (e.g., Styranol ND 430).

C. Hygroscopic Particulate Fillers

Hygroscopic particulate fillers can be added to the composition to enhance the adhesive performance of the hydrophobic and hydrophilic materials. The use of such hygroscopic agents is beneficial as a means to enhance the penetration of water into the adhesive layer on a label as well as to control the kinetics of adhesive activation based on the distribution and redistribution of the activation fluid (or solvent) into both the hydrophilic and hydrophobic regions of the adhesive. In order for the adhesives to transition from their non-tacky to tacky state, they require a certain amount of water and/or solvent moisture to be present within the material. The retention of this moisture can be utilized as a mechanism to preserve viscoelastic flow of the polymer layer and in turn create a tacky label. However, excessive moisture can prevent the contact of the adhesive with the substrate by acting as a physical barrier to the generation of adhesive interactions resulting in the migration of the label from the desired application area on a substrate during down-stream processing. An added benefit of the use of hygroscopic agents is their ability to reduce the phenomena of 'blocking' in self-wound rolls of labels having a surface coated with the adhesive composition described herein.

These hygroscopic particulate filler materials are typically available as colloidal suspensions in a variety of solvents or as solids and are incorporated into the final adhesive composition at the desired concentrations. Concentrations of the suspensions are typically in the range of 10% to 90% solids (weight of solids in the suspension to volume of liquid phase of suspension) in either an aqueous or solvent based suspension and present in the final dry film in a ratio from 1% to 25% (weight of dry solids in film as a ratio of other components dry weight in film). However, concentrations below or above this range are possible depending on the composition and/or the desired application.

Care should be taken to prevent the flocculation of these hygroscopic agents during adhesive preparation and storage since these agents are often micro- and nanoparticles, which are prone to aggregation due to their high surface area to volume ratios. Generally, particles within the particulate fillers may have the largest particle dimension between 0.005 µm (micrometers) and 15 µm, more preferably between 0.005 µm and 10 µm, and most preferably between 0.005 µm and 5 µm. As used herein, the term "largest particle dimension" refers to the longest linear dimension between two points on the particle.

Methods to ensure the homogenous distribution of these agents in suspension can include the use of agitation, surfactants, temperature and/or pH. The pre-saturation or treatment of the hygroscopic agents using solvents, water, and/or adhesive components is also possible to alter their affinity for different components of the activating solution.

Suitable hygroscopic particulate fillers include, but are not limited to, alumina, alumina gel, boehmite, pseudoboehmite, clay, calcium carbonate, chalk, magnesium carbonate, kaolin, calcined clay, pyropylate, bentonite, zeolite, talc, silica, silica gel, synthetic aluminum silicates, synthetic calcium silicates, diatomatious earth, anhydrous silicic acid powder, aluminum hydroxide, barite, barium sulfate, gypsum, calcium sulfate, and organic particles, such as hydrophilic and/or hydrophobic polymeric beads including but not limited to polyamides, polyvinyl alcohol, polyvinylpyrrolidone, polyvinylpyrrolidone vinyl acetate and other similar materials as well as combinations of the above materials.

D. Polymer Solvents

Solvent(s) can be added to the composition as means for formulating the hydrophilic and/or hydrophobic materials. For example, solvent(s) can be added to mirror the composition of the solution of the activating fluid to enhance the rapid swelling of the label and quick tack adhesion forces following the exposure of the adhesive layer to the activating fluid. By including the chemistry of the activating solution during the deposition process, the surface of the adhesive can be modified to promote the penetration of the activating solution into the adhesive layer for activation. Furthermore, the incorporation of solvents, particularly those that are less viscous and/or have higher vapor pressures, allows for the deposition of more consistent and uniform adhesive films on the labels. Furthermore, some solvents may be able to prevent any adverse effects of the adhesive layer deposition process on the front side of the label, which must remain pristine for optimal label print quality. Care must be taken to insure that the solvent selected does not damage or deform the substrate being coated. In one embodiment, thermally activated paper is coated with a water based solvent system as primary alcohol, glycols, and acetates tend to damage or activate the thermal ink. Solvents may include, but are not limited to, ethanol, isopropanol, n-propanol, methyl ethyl ketone, toluene, methylene chloride, and/or coalescing agents including polyethylene glycol, glycol ethers, and fatty alcohols.

E. Activating Fluids

The activating fluid composition provides optimal activation of the adhesive component(s) of the layer of adhesive composition of the liner-free label. The activating fluid composition must penetrate into the adhesive layer to moisten the hydrophilic and hydrophobic adhesive components without over-wetting the adhesive surface of the label, which can compromise adhesive performance. In addition, the activating fluid composition needs to be compatible with mechanisms for applying activating fluids onto a liner-free label, such as in stand-alone systems, label printers, labeling lines, or other apparatuses. The activating fluid composition should also be safe, non-toxic and comply with the guidelines established by regulatory boards for their intended purpose.

The purpose of the activating fluid (or solution) is to introduce moisture into the adhesive layer to allow for the conversion of the adhesive from its non-tacky to tacky state. However, given the selection of both hydrophilic and hydrophobic adhesive materials, one must account for the chemistries of the two or more polymers and the solvent used in the deposition process for enabling optimal activation. As described previously, the activating fluid needs to penetrate into the hydrophilic regions of the adhesive layer to generate quick tack then redistribute and remain in the hydrophobic regions to maintain ultimate tack and long-term adhesion.

Upon contact with the adhesive layer, the activating fluid rapidly penetrate into the adhesive layer causing the hydrophilic regions to swell resulting in the generation of quick tack and increasing the surface area of the hydrophobic regions without causing the label to become slick and slide from the desired area of application. In one embodiment, the quick tack will result in average peel strength ranges of greater than about 100 grams/inch within about 5 minutes of application to a substrate, preferably an average peel strength of greater than about 200 grams/inch within about 2 minutes of application to a substrate, more preferably an average peel strength of greater than about 200 grams/inch within about 1 minute of application to a substrate. The activating fluid then distributes into the hydrophobic regions resulting in their swelling and ultimate adhesion to the substrate. This adhesion to the substrate results in average peel test values in the range from about 100 grams/inch to about 1,000 grams/inch, preferably from about 200 grams/inch to about 1,000 grams/inch, more preferably from about 400 grams/inch to about 1,000 grams/inch. The activating fluid then is removed from the hydrophilic regions either into the hygroscopic filler or by evaporation so that ultimate tack is not compromised by the presence of excess moisture in the label.

Suitable solvents include, but are not limited to, water; acetone; acetonitrile; lower alcohols (i.e., having from 1-10 carbons) including, but not limited to, methanol, ethanol, isopropyl alcohol, n-propanol, n-butanol, 2-butanol, isobutanol, 2-methy-2-butanol, n-pentanol, n-hexanol, 2-hexanol, cyclohexanol, n-heptanol, n-octanol, n-nonanol, n-decanol; glycols including, but not limited to, propylene glycol, ethylene glycol, and butylene glycol; fatty alcohols (i.e., having more than 10 carbons) including, but not limited to, undecanol, dodecanol, 1-tetradecanol, arachidyl alcohol, docosanol, tetracosanol, hexacosanol, octanosol, triacontanol, cetyl alcohol, stearyl alcohol, and polycosinol; ketones, such as methyl ethyl ketone; esters, such as lower (i.e., having from 1-10 carbons) acetates including, but not limited to, methyl acetate, ethyl acetate, n-propyl acetate, isopropyl acetate, isobutyl acetate, sec-Butyl acetate, tert-Butyl acetate, 3-methyl-1-butyl acetate; mineral spirits; oils, such as linseed oil and vegetable oil; citrus based solvents, such as limonene, other primary, secondary, and tertiary alcohols, and combinations thereof.

Low volatile solvents, such as ethylene glycol and propylene glycol, are particularly useful in extending the latency period.

Low surface energy solvents, such as isopropyl alcohol are particularly effective in increasing wet out on hydrophobic and/or low surface energy substrates.

The polymer selection for the adhesive formulation can be such that the activation solvent required to activate the label is water. However, selecting polymers that only require water to rapidly transition from non-tacky to active may not be desirable as the finished labels are highly vulnerable to blocking due to absorption of atmospheric moisture, causing a transition from the non-tacky state to the tacky state.

Therefore, in one embodiment, the activating fluid contains at least two or more solvents. The first solvent or component is water or an aqueous solution which allows for rapid wetting and swelling of the hydrophilic regions of the adhesive to generate the quick tack responsible for the initial adhesion of the label to the substrate. However, as the water is drawn into the hygroscopic filler, quick tack is lost and must be replaced by ultimate or long-term tack, derived from the hydrophobic regions, which exhibit some swelling behavior in water. Thus, a second solvent or component is a non-aqueous (non-water) solvent containing hydrophobic chemical moieties which enhances the activation of the hydrophobic regions by increasing the permeability of the activating fluid into these regions. In a particular embodiment, the non-aqueous solvent is partly miscible or fully miscible with water. By using a mixture of solvents, the swelling of the hydrophobic regions can increase the surface area of the hydrophobic regions exposed for solvent penetration, resulting in the more rapid generation of ultimate tack. An optional third solvent or component, which preferably is a volatile material, may be used to aid in the removal of excess moisture from the adhesive layer to promote stronger adhesion.

In one embodiment, the solvent contains between 5% and 20% of a non-toxic organic solvent in an aqueous solution. Care should be taken to match the polymer adhesive layer with suitable solvents that will activate the layer within the parameters discussed above. In a particular embodiment, the activation composition is a mixed solvent system with 1-50% w/w alcohol in water, preferably a 10% w/w mix of an alcohol in water. However, any polar solvent with some water miscibility containing hydrophobic chemical moieties may also be used.

The solvent system can be varied for a particular adhesive composition in order to vary the properties of the adhesive composition. For example, the examples below show that the activating solvent can be varied to correlate with the selected hydrophilic and/or hydrophobic materials to achieve the desired performance. Generally, a solvent is a liquid fluid that either solubilizes or swells polymeric components of a solvent sensitive film. A non-solvent is a liquid fluid that does not solubilize or swell the polymeric components of a solvent sensitive film. In one embodiment, non-solvent can be incorporated into the activation fluid to reduce the overall average peel adhesion of the label. In another embodiment solvent with a vapor pressure greater than that of water at a given temperature can be incorporated into the activation fluid to lower the amount of time required to achieve acceptable ultimate adhesion values.

To decrease surface tension, enhance solvent spreading on the adhesive film surface, and/or promote activating solvent penetration, surfactants may be added to the activating fluid. Surfactants may also help in the delivery of the activating fluid by allowing for the creation of finer mists with smaller particle sizes during atomization (when used to apply the activating fluid to the adhesive layer of a label) which can promote adhesive activation by increasing the surface area for the interaction between the activating solution and the adhesive layer. Classes of surfactants that can be used include anionic, cationic, non-ionic and amphoteric surfactants. Specific examples include lecithin, Span™-60, Span™-80, Span™-65, Tween™-20, Tween™-40, Tween™-60, Dynol™ 604 (Air Products), Surfynol™ (Air Products), Pluronics™ (BASF, Germany), Polysorbates™ (Tween™), Sodium dodecyl sulfate (sodium lauryl sulfate), Lauryl dimethyl amine oxide, Cetyltrimethylammonium bromide (CTAB), Polyethoxylated alcohols, Polyoxyethylene sorbitan, Octoxynol™ (Triton X100™), N,N-dimethyl-dodecylamine-N-oxide, Hexadecyl-trimethylammonium bromide (HTAB), Polyoxyl 10 lauryl ether, Brij™ 721™, Bile salts (sodium deoxycholate, sodium cholate), Polyoxyl castor oil (Cremophor™), Nonylphenol ethoxylate (Tergitol™), Cyclodextrins, Lecithin, or Methylbenzethonium chloride (Hyamine™).

F. Other Additives

Additives may incorporated into activating fluid, such as acids, bases, buffers, antimicrobial agents, stabilizers, emulsifiers, and/or defoaming agents, as needed for the particular application.

Other additives may be added into the compositions to modulate the performance of the liner-free labels. These additives may be selected for a variety of purposes, such as enhancing water penetration, reducing blocking, increasing quick tack and/or long-term adhesion as well as improving latency (the time between label activation and application). Potential classes of additives include, but are not limited to, colorants, both dye and pigment based, salts, sugars, other carbohydrates, polyelectrolytes, proteins, dry and liquid surfactants, resins, wetting agents, additive that provide desired lay flat properties of the labels, such as humectants, polyethylene glycol, and/or salts, other similar materials as well as combinations thereof. These additives can be incorporated into one or both of the polymer components, the polymer solvent, the activating fluid, or combinations thereof.

In particular, the use of non-volatile solvents, plasticizers, coalescents, oligomers, and/or polymers in the activation may extend the open time of a given adhesive composition. The additives in the activation spray should not clog the applicator used to apply the activation spray and should not require excessive cleanup.

III. Kits

Kits containing the adhesive compositions or the components to prepare the adhesive compositions are described herein. In one embodiment, the kit contains, premixed, the hydrophilic and hydrophobic materials, as well as any additives. The mixture can be in the form of a solution or suspension in a suitable solvent. Alternatively, the mixture can be a solid, which is formulated into a solution or suspension by the user. In these embodiments, the kit can contain one or more solvents for formulating the adhesive composition. The hydrophilic materials, hydrophobic materials, additives, and/or solvents can be provided in appropriate containers, such as drums or totes. The kit may also contain instructions for preparing the adhesive composition as well as instructions for applying it to labels. The kit can also contain the activating solution, which is packaged in a separate container, such as a drum or tote. The activating solution may contain one or more additives already dissolved or dispersed in the activating solution. Alternatively, the additives can be added to the activating solution prior to use. In other embodiments, the kit contains the adhesive composition, optionally any additives, and the activating fluid, wherein the adhesive composition and the activating fluid are packaged and/or delivered separately but are used in combination to prepare liner-less labels.

In some embodiments, the adhesive composition and the activating solution are sold to an entity that applies the adhesive composition to labels and sells the treated labels and the activating solution to the final end user. The entity that sells the treated labels and the activating solution to the final end user can package the labels and activating solution with a printing/labeling device, fitted with an aftermarket device to activate the labels, used to print the labels and/or apply them to commercial products.

In another embodiment, finished labels are provided to the final customer in which the adhesive composition has been applied prior to packaging of the labels. The user loads the labels into the appropriate printing/labeling device, as described above and in U.S. Patent Application No. 2011/0033698 by Woods et al., which has been fitted with the aftermarket device for activating the adhesive composition. The aftermarket device applies the activating solution to the label to activate the adhesive and is reusable. The aftermarket device can be replaced as needed. Once an end user has acquired the aftermarket device, kits containing labels and the activating solution, which is charged into the aftermarket device, can be purchased by the end user. In other embodiments, the aftermarket device is not retrofitted but a unique printer/labeling device with the activating device built into the printer device.

In specific embodiments, kits are sold to label coaters/manufacturers. The kits can contain one or more of the following: (1) drums, pales, totes, or other bulk containers containing adhesive to be coated onto a face sheet using a large format web-based coater; (2) drums, pales, totes, or other bulk containers containing activation fluid to be repackaged into refill stations, reusable containers, or disposable cartridges; (3) refill stations, reusable containers, or disposable cartridges containing activation fluid; (4) wide format rolls of liner-free labels; and combinations thereof. The elements of the kit can be sold to a single coater/manufacturer or do multiple coaters/manufacturers.

In other embodiments, kits are sold to the end user. These kits can contain one or more of the following: (1) a liner-free label with an adhesive on the back side of the substrate, activated by a volatile solvent fluid sprayed by a single nozzle mounted to retrofit to a label printer; (2) a liner-free label with an adhesive on the back side of the substrate, activated by a nonvolatile solvent fluid sprayed by a single nozzle mounted to retrofit to a label printer; (3) a liner-free label with an adhesive on the back side of the substrate, activated by a nonvolatile solvent fluid sprayed by an array of nozzles mounted to retrofit to a label printer; (4) a liner-free label with an adhesive on the back side of the substrate activated by a volatile solvent fluid sprayed by an array of nozzles mounted to retrofit to a label printer; (5) a Liner-Free Label with a primer layer on the back side of the substrate, with an adhesive applied to the substrate by a single nozzle mounted to retrofit to a label printer; (6) a Liner-Free Label with a primer layer on the backside of the substrate, with an adhesive applied to the substrate by an array of nozzles mounted to retrofit to a label printer; (7) a Liner-Free Label with a primer layer on the backside of the substrate, with an adhesive applied to the substrate by a single nozzle, and then activated by a volatile solvent fluid sprayed by another nozzle, mounted to retrofit to a label printer; (8) a Liner-Free Label with a primer layer on the backside of the substrate, with an adhesive applied to the substrate by a single nozzle, and then activated by a nonvolatile solvent fluid sprayed by another nozzle, mounted to retrofit to a label printer; (9) a Liner-Free Label with a primer layer on the backside of the substrate, with an adhesive applied to the substrate by an array of nozzles, and then activated by a volatile solvent fluid sprayed by another array of nozzles, mounted to retrofit to a label printer; (10) a Liner-Free Label with a primer layer on the backside of the substrate, with an adhesive applied to the substrate by an array of nozzles, and then activated by a nonvolatile solvent fluid sprayed by another array of nozzles, mounted to retrofit to a label printer; (11) a Liner-Free Label with no coating on the back side of the substrate, with an adhesive applied to the substrate by a single nozzle mounted to retrofit to a label printer; (12) a Liner-Free Label with no coating on the backside of the substrate, with an adhesive applied to the substrate by an array of nozzles mounted to retrofit to a label printer; (13) a Liner-Free Label with no coating on the backside of the substrate, with an adhesive applied to the substrate by a single nozzle, and then activated by a volatile solvent fluid sprayed by another nozzle, mounted to retrofit to a label printer; (14) a Liner-Free Label with no coating on the backside of the substrate, with an adhesive applied to the substrate by a single nozzle, and then activated by a nonvolatile solvent fluid sprayed by another nozzle, mounted to retrofit to a label printer; (15) a Liner-Free Label with no coating on the backside of the substrate, with an adhesive applied to the substrate by an array of nozzles, and then activated by a volatile solvent fluid sprayed by another array of nozzles, mounted to retrofit to a label printer; (16) a Liner-Free Label with no coating on the backside of the substrate, with an adhesive applied to the substrate by an array of nozzles, and then activated by a nonvolatile solvent fluid sprayed by another array of nozzles, mounted to retrofit to a label printer; and combinations thereof.

The kits can include a device which is retrofitted to a label printer which prints, activates, and/or applies the labels. The activating fluid can be supplied in cartridge form which is inserted into or attached onto the retrofitted device. The cartridge may be removable once the fluid has been exhausted. The cartridge can be refilled by the end user or can be returned to a supplier who provides refilled cartridges. In other embodiments, the fluid is delivered to the retrofitted device in a container that plugs into a reservoir that is contained within the retrofit to the label printer.

In those embodiments, where the label contains a primer layer between the label and the adhesive layer, the primer layer can be applied to the label by the label manufacturer who provides the primer-coated labels to the end user.

The end user can then apply the adhesive layer to the label using the retrofit to the label printer. As discussed above, the adhesive can be contained in a cartridge form that is removable from the retrofit to a label printer or in a container that plugs into a reservoir that is contained within the retrofit to a label printer. In some embodiments, the back side of the label is uncoated and the adhesive is applied via the retrofit described above (e.g., cartridge or container).

The retrofit can be a device that is mounted to a label applicator or other form of "print-apply" labeling equipment. Alternatively, the retrofit can be a device that is a standalone device with no connections to any printing or labeling equipment.

IV. Methods of Making Adhesive Compositions

The hydrophilic and hydrophobic polymers can be packaged individually, along with one or more solvents, and mixed together at a later time. Alternatively, the polymer can be mixed together to form a blend and dissolved or suspended in a solvent in the form of an emulsion, suspension, or solution.

As discussed above, the hydrophilic and hydrophobic polymers can be provided individually, or as a mixture, in the form of a solid, solution, or suspension. Prior to the preparation of the final adhesive composition, all formulations are diluted to the desired concentrations with distilled water or appropriate organic solvent.

The desired coating concentration of the formulations is between 25% and 55% solids (weight-to-volume). Depending on the particular combination of components in the adhesive compositions, the hydrophobic and hydrophilic adhesive components are mixed together in the appropriate ratios followed by addition of the other components. For example, if the hygroscopic particulate filler to be added is in the form of a colloidal suspension, the polymer mixture can be mixed into this suspension; if the hygroscopic agent is a solid, it can be added to the polymer mixture. In general, solutions are added in increasing order of viscosity followed by solids. To ensure the homogeneity of the final product, shear is introduced to the formulation V. Methods of Using Adhesive Compositions The final liner-free label is composed of an adhesive layer and a facestock. Application of the adhesive layer to the facestock is part of the manufacturing process that influences the end adhesive performance.

A. Facestocks

Unlike other water and solvent activated labels and adhesive systems, the adhesive compositions described herein can be applied to a variety of facestocks, with a variety of MVTR of the facestock. Suitable facestocks include, but are not limited to, paper, top-coated and non-top-coated grades of direct thermal paper, polymer films, woven and non-woven synthetic materials, wood, metal films, composite films, plastics, and mylar. In some embodiments, the face stock can be printed on with a suitable printing device. In other embodiments, the adhesive side of the label can receive dye/ink/pigment from a printing device, for example, printer registration marks.

B. Substrates

The adhesive compositions described herein can be used to adhere coated labels to a variety of substrates. Suitable substrates include, but are not limited to, paper, cardboard, and metal, glass and plastics commonly used in commercial applications including, but not limited to, polyethylene terephthalate (PETE, PET, PETG), polyethylene (PE), polystyrene (PS), low-density polyethylene (LDPE), linear low-density polyethylene (LLDPE), high density polyethylene (HDPE), polypropylene (PP), polyvinyl chloride (PVC) and polyvinyl chloride films, and TYVEK®, as well as other low energy and thermoplastic substrates.

In some embodiments, the adhesives are designed to adhere to a single specific substrate but do not adhere to other substrates. In one embodiment, the adhesive can be designed to have a specific strength of adhesion and/or mode of failure. For example, for pharmacy bottles, the adhesive formulation can be designed to be clean-peel but have a high peel strength. This occurs when the adhesive bond between the facesheet and the substrate is the mode of failure of the label. More specifically, the adhesive bond has a lower failure point than the construct of the facesheet. In other embodiments, the adhesive is designed to adhere to a variety of substrates with little or no modification of the adhesive formulation.

The adhesive composition (or blend) can be applied to the above listed facestocks utilizing typical web coating methods including, but not limited to, knife of roll, gravure, reverse-gravure, metering rod, slot die, and air knife coating methods.

The coat weight of the adhesive composition on the facestock is largely dependent upon the end use application of the solvent sensitive adhesive label. To reduce cost, coat weights of 3 dry grams of adhesive per square meter are typically used. However, coat weights up to 25 dry grams per square meter may be also be used.

After the application of the adhesive composition to the facestock web, the remaining water and solvent is extracted from the adhesive composition. This may be accomplished using conventional methods including, but not limited to, air flotation oven, web over rollers oven, energy cure methods, and the like. Alternatively, the adhesive composition can be designed such that the polymer, copolymers, or particulate filler in the adhesive composition trap excess polymer solvent and/or activation spray, such that the vapor pressure of the combined system (polymer(s)+spray) is less than that of the spray alone.

This allows any overspray that did not make contact with the label to evaporate, yet keeps the label tacky indefinitely. In one embodiment, this can be accomplished by incorporating inorganic salts as particulate filler into the adhesive formulation.

Optionally, it may be desirable to coat thermally activated paper and films. Care must be taken in adhesive selection to ensure that the components formulating the adhesive composition do not contain certain chemistries or solvents that negatively interact with the embedded thermal dye. In addition, during the drying (or solvent removal) process, the heat or energy from the process should not activate the thermal paper (a processes known as imaging). Sometimes the coating of a web with an adhesive can induce a phenomenon known as a shape memory or curling. As it is often important for end applications that labels have lay flat properties, a number of additives can be added to the adhesive formulation to prevent curl, as described earlier. In addition, mechanical methods can be employed to reduce curl. Also, the addition of vaporized water (or other liquid vapors) to the non-adhesive coated side of the label can have dramatic effects in reducing curl.

C. Coated Labels

In one embodiment, the final product is a label having three layers: a first layer which is printable upon such as by a typical label printer, second layer of face stock material, and then a third layer of adhesive composition described herein, e.g., coated on one surface of the face stock, such as a film composed of a blend of hydrophobic and hydrophilic polymers containing a dispersion of hygroscopic particulate filler and other additives. Preferably, there is a continuous phase composed of a homogenous mix of all adhesive polymers with a uniform dispersion of the filler. Alternatively, there is phase separation of the polymers resulting in a film composed of two phases, one rich in the hydrophilic polymer and one rich in the hydrophobic polymer; this can occur in two different ways, one with a continuous phase of the hydrophobic polymer with regions of hydrophilic polymer or vice versa. In these embodiments, the filler is dispersed uniformly in both phases or preferentially localized to one of the polymer-rich phases. In some embodiments, the filler particles are localized to the surface of the film; in others, they are localized to the interface between the paper and the adhesive or distributed uniformly in the z-axis. In all embodiments, the adhesive portion of the liner-free label is in a non-tacky state prior to activation by the activating solution.

The labels can also be designed to indicate product tampering. In one embodiment, the labels can be designed to leave a residue, such as part of the label, if the label is removed from the packaging/container. For example, labels can be applied to a container containing pharmaceutical products. If someone attempts to remove the label, the residue from the label remains on the container indicating that the original label has been removed. This may be useful if the label is applied to the container such that if the container is opened, the label is compromised and leaves a residue behind.

Adhesive compositions containing one or more hydrophilic materials and one or more hydrophobic materials exhibit higher peel strengths than materials containing one or more hydrophilic or one or more hydrophobic materials alone. As shown in the examples, compositions containing one or more hydrophilic materials and one or more hydrophobic materials exhibited higher average peel strengths and higher peak peel strengths compared to adhesives containing one or more hydrophilic or one or more hydrophobic materials alone.

EXAMPLES

Example 1

Representative Adhesive Compositions

Adhesive compositions were prepared as shown in Table 1.

TABLE 1

| Adhesive Composition Examples | | |
|---|---|---|
| | Hydrophilic polymer | Hydrophobic polymer |
| Adhesive Base Embodiment A | | |
| Polymer | Polyvinylpyrrolidone-vinyl acetate | Poly(styrene-butadiene) |
| Trade Name | Luvitec ® VA 64 | Styronal ® ND 430 |
| Manufacturer | BASF | BASF |

TABLE 1-continued

| Adhesive Composition Examples | | |
|---|---|---|
| | Hydrophilic polymer | Hydrophobic polymer |
| Ratio | 25% | 75% |
| Adhesive Base Embodiment B | | |
| Polymer | Polyvinylpyrrolidone-vinyl acetate | Poly(styrene-butadiene) |
| Trade Name | PVP/VA-735 | Rovene ® 4049 |
| Manufacturer | ISP Corp | Mallard Creek Polymers |
| Ratio | 30% | 70% |
| Adhesive Base Embodiment C | | |
| Polymer | Poly(2-ethyl-oxazoline) | Latex styrene acrylate dispersion |
| Trade Name | Aquazol 500 | Arconal ® NS 567 |
| Manufacturer | Ashland Chemical Co, | BASF |
| Ratio | 20% | 80% |

The amounts and proportions of the hygroscopic fillers, solvents, and/or additive agents are selected in accordance with the desired adhesive performance in the liner-free label in response to exposure to the particular activating fluid to be used. For example, an adhesive formulation was prepared containing 95% (by dry weight) Adhesive Base Embodiment A and 5% (by dry weight) colloidal nanoscale silica (a hygroscopic filler) suspended in isopropyl alcohol. This embodiment was activated with a 10% isopropyl alcohol solution in distilled water.

In another example, an adhesive was prepared containing 70% Adhesive Base Embodiment B and 30% colloidal nanoscale silica in an aqueous suspension with a basic pH. The emulsion was stabilized with the addition of anionic surfactants.

In yet another embodiment, an adhesive was prepared containing 75% Adhesive Base Embodiment C and 25% colloidal nanoscale silica in a methyl ethyl ketone suspension.

Example 2

Preparation and Evaluation of Adhesive Compositions

A series of solvent-sensitive adhesive liner-free labels were prepared in accordance with the teachings above and the following detailed description to test adhesion properties. In accordance with the embodiment(s) described above, the solvent-sensitive adhesive agent layer was coated on 77 g/m$^2$ thermal paper. Each formulation's solvent-sensitive adhesive agent layer was both (1) prepared at 30% solids and (2) coated using a #24 Mayer rod to achieve a coating dry film weight of 10.8±2 pounds per ream (3000 ft$^2$). Solvent sensitive adhesive agent layer was dried in a 40° C. oven for about 3 min to achieve a total moisture content of the dried solvent-sensitive adhesive liner-free label of 5% to 7%. Adhesive compositions containing one or more hydrophilic materials and one or more hydrophobic materials were prepared and the peel strengths of the compositions were measured. For comparison, adhesive compositions containing only hydrophilic materials or only hydrophobic materials were prepared and the peel strengths measured. Samples were cut into 1 inch by 9 inch strips as required by the test method. Samples were activated by the activation spray described in Table 2 sprayed from a hand controlled spray nozzle just prior to application with approximately 3 to 15 mg/in$^2$ of activation spray. The sample strips were applied to the polyethylene terephalate substrate by hand by pressing and smoothing the label flat. The force required for removal of the sample strips was measured, averaged, and the mode of failure noted in Table 2. Three replicates of each sample were tested. Samples were tested at a dwell time of 2 minutes. Dwell time is the amount of time the activated label is in contact with a substrate. Dwell time does not incorporate the elapsed time between activation and application to a substrate. Peel strength was measured using AS™ Standard D3330 (Standard Test Method for Peel Adhesion of Pressure-Sensitive Tape). The results are shown in Table 2.

TABLE 2

Adhesive Composition and 180° Peel Adhesion to Polyethylene terephthalate

| Formulation # | Hydrophile | Hydrophobe | Ratio Hydrophile:Hydrophobe | Additive | Mode of Failure[2] | Peel Strength (grams/inch) Average | Peak | Activation Spray (wt %)[3] |
|---|---|---|---|---|---|---|---|---|
| 1 | Aquazol 500/ PVP/VA 735 | N/A | 100:0 | N/A | AF | 53 | 193 | 1% Dynol 604 |
| 2 | Aquazol 500/ Aquazol 200 | N/A | 100:0 | N/A | AF | 12 | 29 | 1% Dynol 604 |
| 3 | Aquazol 500/ Aquazol 200 | N/A | 100:0 | N/A | AF | 82.5 | 176.5 | 10% Ethanol |
| 4 | Aquazol 500/ Aquazol 200 | N/A | 100:0 | N/A | AF | 40 | 168.5 | 10% Isopropanol |
| 5 | N/A | Acronal A220/ Acronal 296D[4] | 0:100 | N/A | AF | 0.4 | 0.7 | 1% Dynol 604 |
| 6 | Aquazol 500 | Styranol ND430 | 70:30 | N/A | AF | 103 | 197.5 | 10% Ethanol |
| 7 | Aquazol 500 | Styranol ND430 | 30:70 | N/A | AF | 211 | 371.5 | 10% Ethanol |
| 8 | PVP/VA 735 | Styranol ND430 | 70:30 | N/A | AF | 22.5 | 78.5 | 10% Ethanol |
| 9 | PVP/VA 735 | Styranol ND430 | 30:70 | N/A | AF | 93 | 430 | 10% Ethanol |
| 10 | Aquazol 500 | Styranol ND430 | 30:70 | 10% IPA-ST[1] | FD | 95.7 | 193.7 | 10% Isopropanol |
| 11 | Aquazol 500 | Styranol ND430 | 30:70 | 10% IPA-ST | FD | 188.7 | 285 | 10% Isopropanol |
| 12 | Aquazol 500 | Styranol ND430 | 30:70 | 10% IPA-ST | FD | 234 | 333 | 10% Isopropanol |
| 13 | Aquazol 500 | Styranol ND430 | 30:70 | 10% IPA-ST | FD | 169.7 | 302.7 | 10% Isopropanol |

[1]IPA-ST is colloidal silica supplied in a 30% suspenison in isopropanol by Nissan Chemical American Corporation (Houston, TX).

[2]Mode of Failure:

AF—adhesive failure - the adhesive was removed from the substrate cleanly

FD—face delamination - the face stock delaminated or separated during testing. The adhesive bond strength exceeded the internal strength of the face material.

[3]Activation Spray solutions prepared in deionized water with component as listed in Table 2. The balance of the activation spray is deionized water. Dynol 604 is supplied by Air Products (Allentown, PA).

[4]Acronal A220 is an aqueous acrylate copolymer emulsion supplied at 60% wt solids and Acronal 296D is an aqueous dispersion of a copolymer of butyl acrylate and styrene supplied at 50% wt solids, both by BASF Corporation (Charlotte, NC).

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

We claim:

1. A fluid activatable adhesive composition for a liner-free label comprising at least two polymeric materials with different hydrophilicities, which are activated by an activating fluid comprising a cosolvent comprising water and one or more organic solvents, wherein the at least two polymeric materials provide quick tack and ultimate adhesion when exposed to the activating fluid.

2. The composition of claim 1, wherein the more hydrophilic polymer is selected from the group consisting of polyvinyl alcohols, polyvinyl acetates, polyvinylpyrrolidones, polyvinylpyrrolidone-vinyl acetate copolymers, polyacrylic acids, polyacrylates, polyethylene glycols, poly(2-ethyl-2-oxazoline), polyacrylamide copolymers, ethylene vinyl acetates, cellulose derivatives, ureas, gelatins, alginates, agars, gum arabics, and combination thereof.

3. The composition of claim 2, wherein the hydrophilic polymer is polyvinylpyrrolidone (PVP), poly(2-ethyl-2-oxazoline), or combinations thereof.

4. The composition of claim 2, wherein the concentration of the hydrophilic material(s) is from about 10% to about 50% by weight of the adhesive composition in a dry state.

5. The composition of claim 2, wherein the concentration of the hydrophilic material(s) is from about 20% to about 40% by weight of the adhesive composition in a dry state.

6. The composition of claim 1, wherein the hydrophobic polymer is selected from the group consisting of natural and reclaimed rubbers, polyurethanes, non-carboxylated and carboxylated styrene-butadiene rubbers, polyacrylics, polyamides, polyesters, polyolefins, polystyrenes, polyvinyl esters, polyvinyl ketones, polydiene elestomers, polyisobutylenes, and combinations thereof.

7. The composition of claim 4, wherein the hydrophobic polymer is polystyrene-butadiene.

8. The composition of claim 6, wherein the concentration of the hydrophobic material(s) is from about 40% to about 80% by weight of the dry film.

9. The composition of claim 1, wherein the composition further comprises a hygroscopic particulate filler.

10. The composition of claim 9, wherein the hygroscopic particulate filler is selected from the group consisting of alumina, alumina gel, boehmite, pseudoboehmite, clay, calcium carbonate, chalk, magnesium carbonate, kaolin, calcined clay, pyropylate, bentonite, zeolite, talc, silica, silica gel, synthetic aluminum silicates, synthetic calcium silicates, diatomatious earth, anhydrous silicic acid powder, aluminum hydroxide, barite, barium sulfate, gypsum, calcium sulfate, organic particles comprising hydrophilic and/or hydrophobic polymeric beads, non-woven microfibers and combinations thereof.

11. The composition of claim 10, wherein the concentration of the hygroscopic material(s) is from about 1% to 25% by weight of the dry film.

12. The composition of claim 1, wherein the composition further comprises one or more additives selected from the group consisting of salts, carbohydrates, polyelectrolytes, proteins, dry and liquid surfactants, resins, wetting agents, humectants, polyethylene glycol, and combinations thereof.

13. The composition of claim 1, further comprising one or more solvents or plasticizers.

14. The composition of claim 1, wherein the composition is in the form of a solution, suspension, or emulsion to be applied to a facesheet or substrate for the purposes of constructing a fluid activatable adhesive composition for a liner-free label.

15. The composition of claim 13, wherein the composition of the one or more solvents is equivalent to the composition of an activating fluid which activates the adhesive composition, wherein the one or more solvents enhance the rapid generation of adhesive following the exposure of the adhesive layer to the activating fluid.

16. An adhesive liner-free label comprising the composition of claim 1.

17. A kit comprising the adhesive composition of claim 1 and an activating fluid comprising water and one or more organic solvents.

18. The kit of claim 17, wherein the organic solvent is selected from the group consisting of acetone; acetonitrile; methanol, ethanol, isopropyl alcohol, n-propanol, n-butanol, 2-butanol, isobutanol, 2-methyl-2-butanol, n-pentanol, n-hexanol, 2-hexanol, cyclohexanol, n-heptanol, n-octanol, n-nonanol, n-decanol, undecanol, dodecanol, 1-tetradecanol, propylene glycol, ethylene glycol, butylene glycol, arachidyl alcohol, docosanol, tetracosanol, hexacosanol, octanosol, triacontanol, cetyl alcohol, stearyl alcohol, polycosinol, methyl ethyl ketone, ethyl acetate, mineral spirits, linseed oil, vegetable oil, citrus based solvents, limonene, and combinations thereof.

19. The kit of claim 18, wherein the activating fluid comprises an alcohol at a concentration of about 10% by weight of the fluid.

20. The kit of claim 18, wherein the activating fluid comprises an alcohol at a concentration of about 10% 1% to about 50% by weight of the fluid.

* * * * *

UNITED STATES PATENT AND TRADEMARK OFFICE
CERTIFICATE OF CORRECTION

PATENT NO. : 8,334,336 B2  
APPLICATION NO. : 13/294545  
DATED : December 18, 2012  
INVENTOR(S) : Benjamin David Lux et al.

Page 1 of 1

It is certified that error appears in the above-identified patent and that said Letters Patent is hereby corrected as shown below:

Claim 19, column 20, line 46, replace "18" with --20--.  
Claim 20, column 20, line 50, delete "10%".

Signed and Sealed this  
Ninth Day of April, 2013

Teresa Stanek Rea  
*Acting Director of the United States Patent and Trademark Office*